Oct. 28, 1969  SHIRO SUZUKI  3,475,655
METHOD AND MEANS FOR PROTECTING AN AC ELECTRIC SYSTEM FROM
SHORT CIRCUITS BY A DISTANCE RELAY HAVING
QUADRILATERAL CHARACTERISTICS
Filed April 11, 1967  2 Sheets-Sheet 1

(a)

(b)

United States Patent Office 3,475,655
Patented Oct. 28, 1969

3,475,655
METHOD AND MEANS FOR PROTECTING AN AC ELECTRIC SYSTEM FROM SHORT CIRCUITS BY A DISTANCE RELAY HAVING QUADRILATERAL CHARACTERISTICS
Shiro Suzuki, Tokyo, Japan, assignor to Meidensha Electric Mfg. Co. Ltd., Tokyo, Japan
Filed Apr. 11, 1967, Ser. No. 629,964
Claims priority, application Japan, Apr. 11, 1966, 41/22,784
Int. Cl. H02h 7/26
U.S. Cl. 317—27       4 Claims

ABSTRACT OF THE DISCLOSURE

A quadrilateral distance relay having six simulated impedance elements for generating out of phase voltages and means for comparing the relative phases of the voltages to detect fault condition in a transmission line.

---

This invention relates to a distance relay having quadrilateral characteristics. A so-called phase comparison, static type distance relay has the advantage that the characteristics thereof are not influenced by the magnitude of the input signal and it performs or operates at high speed. However, in the prior art relay of this type, the relay is unstable near its tripping or actuation point. The comparison type distance relay is operated by composing simulation circuit and distinguishing the relative phase of the electric voltages involved. However, at a certain operating point the vector voltage to be phase compared becomes very small. Therefore the error in the phase comparison may be very large in the range where said vector becomes small. Because of this phenomenon the error may be increased especially when a fault occurs and the electric input current includes a highly modulated wave.

For instance, referring to FIGURE 4, which illustrates Japanese Patent No. 448,761, the vector diagram will be described hereafter.

In FIGURE 4, IR$g$ is a terminal voltage when electric current I runs through resistance at accident position, and IZ$i$ is another terminal voltage when the electric current I runs through a simulated impedance of the line from the point where the relay is located to the accident position.

If IZ$i$ and IR$g$ are standard vectors, then both $$\dot{I}Z - \dot{V} \text{ and } \dot{V} - \dot{I}Rg$$

are retarded more than —IR$g$ but advanced more than IZ$i$ when the electric voltage vector $\dot{V}$ is within the parallelogram shown by bold line or accident occurs in the established area. Therefore, by the detection of this condition, we are able to obtain a distance relay having quadrilateral characteristics. But it is difficult to initiate exact comparison of phases, because the phase comparison signals $$\dot{I}Zi - \dot{V} \text{ and } \dot{V} - \dot{I}Rg$$

at the points A and B have very small voltages, especially for short transmission lines.

In order to avoid such unstable operation in the prior art, two relays, for instance a mho relay and a reactance relay, are combined. Therefore, the circuit becomes complicated and highly sensitive amplifiers have to be employed.

One object of the present invention is to eliminate those defects stated above, providing a novel short distance, single element relay. Hereinafter, the present invention will be described referring to the accompanying drawings in which.

Figure 1:
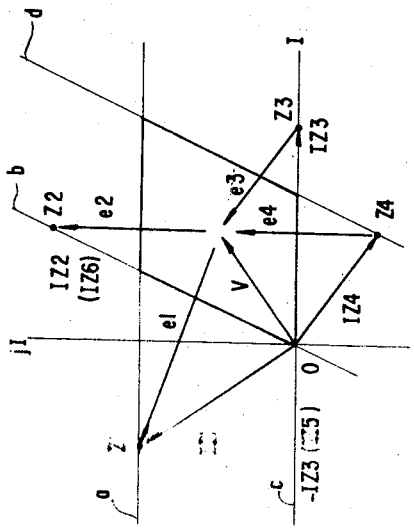
FIGURE 1, FIGURE 2 and FIGURE 3 show diagrams of characteristics for illustration of the present invention.

In FIGURE 1, which shows a vector diagram showing principle of operation of the short distance relay according to the present invention, I and V are electric current and voltage which are proportional to accidental electric current and voltage. $Z_1$, $Z_2$, $Z_3$ and $Z_4$ are simulated impedance on the lines of $a$, $b$, $c$ and $d$ which are the elongated sides of a parallelogram forming a predetermined operation range and shown with bold lines. The voltages obtained from flowing electric current I through said impedances $Z_1$, $Z_2$, $Z_3$ and $Z_4$ become vector voltages I$Z_1$, I$Z_2$, I$Z_3$ and I$Z_4$, where:

$$IZ_1 = -I \times \left( -\left( R - j\frac{1}{wC_1} \right) \right)$$
$$IZ_2 = I \times (R_2 + jwL)$$
$$IZ_3 = I \times R_3$$
$$IZ_4 = I \times \left( R_4 - j\frac{1}{wC_4} \right)$$

Especially, I$Z_1$ is the vector voltage obtained by an electric current 180 degrees out of phase.

Further, $e_1$, $e_2$, $e_3$ and $e_4$ are signal vector voltages composed of said vector voltages I$Z_1$–I$Z_4$ and V, where:

$$e_1 = \dot{I}Z_1 - \dot{V}$$
$$e_2 = \dot{I}Z_2 - \dot{V}$$
$$e_3 = \dot{V} - \dot{I}Z_3$$
$$e_4 = \dot{V} - \dot{I}Z_4$$

Thus, if electric voltage V is within the parallelogram, the following matters are evident. (However, it is assumed that $Z_1$, $Z_2$, $Z_3$ and $Z_4$ are not within the parallelogram.)

(1) $e_1$ and $e_3$ are retarded more than IZ$_5$(—IZ$_3$).

(2) $e_2$ and $e_4$ are advanced more than IZ$_6$(IZ$_2$).

(3) Although $e_1$ or $e_3$ is advanced more than a certain amount of phase determined by $Z_1$ or $Z_3$ against IZ$_6$(IZ$_2$) respectively, neither one is retarded less than IZ$_6$(IZ$_2$).

(4) Although $e_2$ or $e_3$ is retarded more than a certain amount of phase determined by $Z_2$ or $Z_4$ against IZ$_5$(—IZ$_3$), neither one is advanced less than IZ$_5$(—IZ$_3$).

Integrating above stated matters, we can say that (5) Each signal vector $e_1$–$e_4$ is retarded more than IZ$_5$(—IZ$_3$) and advanced more than IZ$_6$(IZ$_2$).

Then, if electric voltage exists outside of the parallelogram we can say as follows according to existence area of the voltage.

(1) If the electric voltage V is over line $a$, then $e_1$, is advanced more than IZ$_5$(—IZ$_3$).

(2) If the electric voltage V is on the left side of line $b$, then $e_2$ is retarded more than IZ$_6$(IZ$_2$).

(3) If the electric voltage V is under the line $c$, then $e_3$ is advanced more than IZ$_5$(—IZ$_3$).

(4) If the electric voltage V is on the right side of line $d$, then $e_4$ is retarded more than IZ$_6$(IZ$_2$).

The condition 5 stated above is effected only when the electric voltage V is within the parallelogram. Therefore, if this condition is detected, then we can obtain a distance relay having quadrilateral characteristics.

If $IZ_2 \doteq V$ and $e_2=0$, for instance, then it is difficult to distinguish the phase of signal 2, as has been stated, but according to the present invention, the condition (1) above stated or such condition that the signal $e_1$ inevitably is advanced then $IZ_5$ is effected, so that there is no probability for the distance relay according to the present invention to cause erroneous motion because it is put into no work condition by the signal $e_1$ independently on the signal $e_2$, even though the signal $e_2$ might be nearly zero.

Accordingly, for the operational limit value, we can obtain a very exact distance relay for distinguishing operation or not operation, without unstable motion as seen in the conventional relays. Also, as the secondary effect of the present invention, it is possible to simplify the circuit for operation of rectangular waves because even though either one of four signals of $e_1$–$e_4$, for instance $e_2$, may be of small value or nearly zero, three other vector voltages $e_1$, $e_3$, $e_4$ may be selected large enough, by selection of $Z_1$–$Z_4$. (A circuit for operation of rectangular wave is for increasing accuracy of phase comparation by making rectangularly waved signal which corresponds to half wave of sine vector voltage.)

Figure 2:
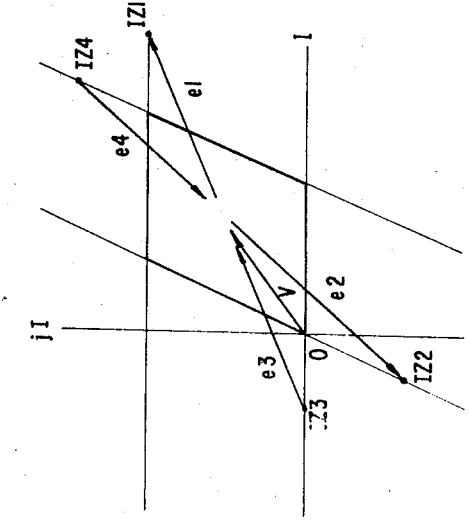
Figure 4:
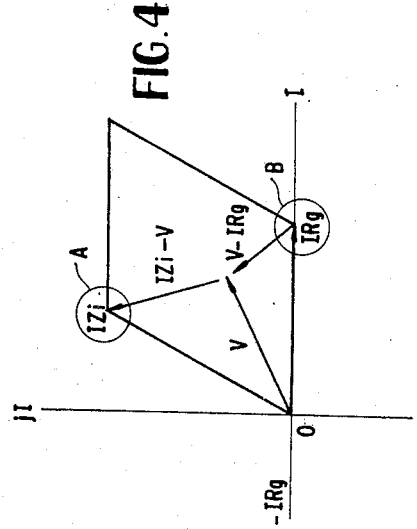
FIGURE 4 shows a diagram of characteristics for illustration of hitherto known relays.

FIGURE 2 shows the case of an altered value of simulated impedance $Z_1$–$Z_4$ in FIGURE 1. The operative condition 5 in this case is that either of $e_1$, $e_2$, $e_3$ and $e_4$ is retarded more than $IZ_2$ and advanced more than $IZ_3$.

Heretofore, there has been no offset. Hereafter, the offset case will be described. In this case, the simulated impedance $Z_3$ may include a reactance component as $Z_3=R_3+jX_3$. But even in this case, the standard vector has to be $IZ_6$ which is shifted as much as impedance $R_2$ and $IZ_5$ which is shifted as much as XC. However, the impedance $Z_6$ and $Z_5$ in this case, are $Z_6=Z_2+R_2$, $Z_5=Z_3+XC$, so that the part of the impedance element not offset can be utilized commonly. Here, the resistance $R_2$ determines the offset amount in the direction of the I axis, and the XC determines the offset amount in the direction of the jI axis.

Figure 3:
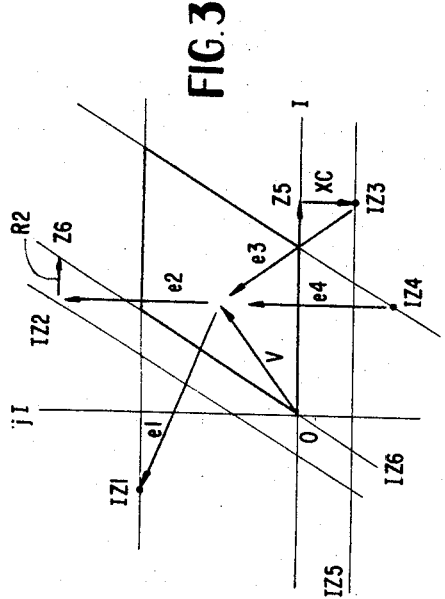
Figure 5:
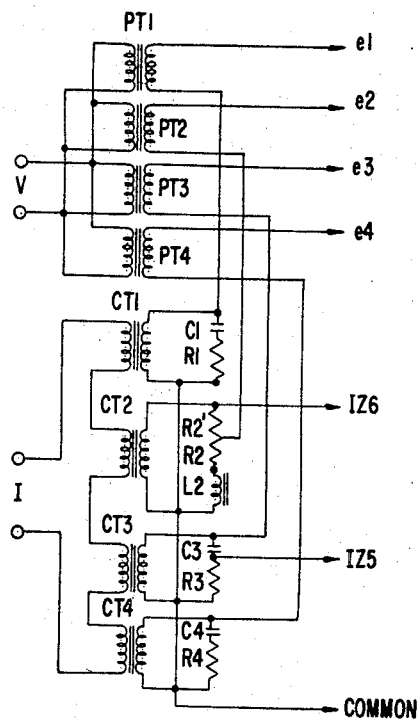
FIGURE 5 shows a circuit diagram for obtaining predetermined vectors.

FIGURE 5 shows a circuit embodiment for obtaining each vector voltage stated above. FIGURE 5 shows the case of FIGURE 3 offset. (For obtaining a circuit of FIGURE 1 not offset, the space between both ends of $R'_2$ and $C_3$ has to be short-circuited.)

In the drawing, $PT_1$–$PT_4$ denote voltage transformers, $CT_1$–$CT_4$ denote current transformers and the transformation ratio is made 1:1, for simplification.

Considering the simulated impedance as including the windings of transformers $CT_1$–$CT_4$, $$Z_1 = -\left(R_1 - j\frac{1}{wC_1}\right)$$

$$Z_2 = R_2 + jwL_2$$

$$Z_3 = -\left(R_3 - j\frac{1}{wC_3}\right)$$

$$Z_4 = -\left(R_4 - j\frac{1}{wC_4}\right)$$

$$Z_5 = -R_3$$

$$Z_6 = R_2' + R_2 + jwL_2 = R_2' + Z_2$$

Obviously in FIGURE 5, $e_1$–$e_6$ are sine waves. Modifying the positive or negative half waves into rectangular pulses of which the widths correspond to the half waves of the sine wave as shown in FIGURE 6a, then vector relations of $e_1$–$e_6$ can be drawn as shown in FIGURE 6b.

In FIGURE 6b, the sequence of pulse generation is shown, for convenience, as $e'_6 \rightarrow e'_1 \rightarrow e'_3 \rightarrow e'_4 \rightarrow e'_5$.

Figure 6:
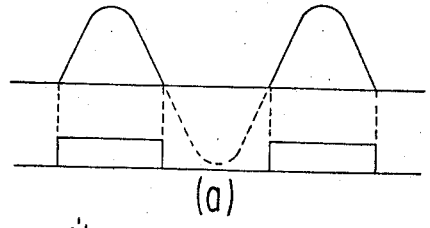
FIGURE 6 shows a wave form diagram for illustration.
Figure 6:
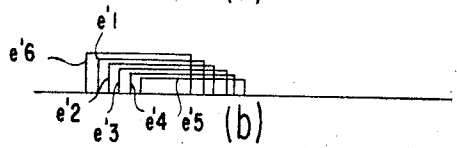
Figure 7:
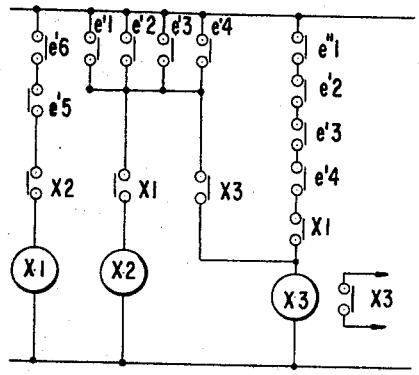
FIGURE 7 shows a sequence showing an embodiment of a phase comparison apparatus.

FIGURE 7 shows an example of a circuit which initiates phase comparison employing six vector voltage signals of $e_1$–$e_6$ as $IZ_5$, $IZ_6$ of FIGURE 5 are $e_5$ and $e_6$. In FIGURE 7, $e'_1$–$e'_6$ denote periods when each of the rectangular pulses shown in FIGURE 6 exists, a sequence of a contact point circuit to be a junction point $a$ for making, and a junction point $b$ for breaking. $(X_1)(X_2)(X_3)$ denote auxiliary relays, of high speed for operation and returning. In such a circuit, if the $e'_6$ makes as $e'_6$ shown in FIGURE 6 rises up, then $e'_1$–$e'_4$ are in a condition of break, and the relay $(X_1)$ is operated. If $e'_1$–$e'_4$ make before $e'_5$ makes ($b$ junction point of $e'_5$ breaks), then the relay $(X_3)$ is operated, and once the relay $(X_3)$ is operated, it is synchronized with the signal finally made ($e'_4$ in FIGURE 6b).

If either of $e'_1$–$e'_4$ makes before $e'_6$, then the relay $(X_2)$ is operated before the relay $(X_1)$ to lock the relay $(X_1)$, so that the relay $(X_3)$ is not operated. Unless either of $e'_1$–$e'_4$ makes before junction point $b$ of $e'_5$ breaks, the relay is not operated also.

In other words, in FIGURE 7, there is the capability of distinguishing that either of $e_1$–$e_4$ is retarded more than $e_6$ but advanced more than $e_5$.

Figure 8:
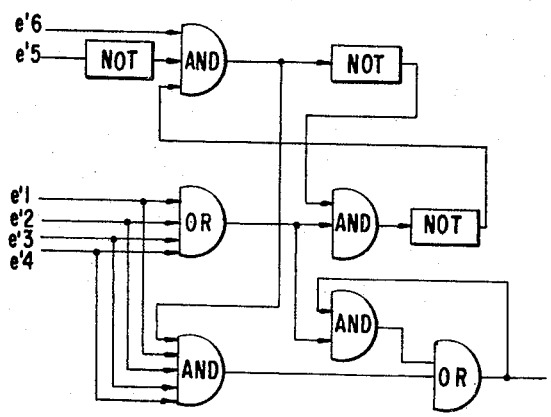
FIGURE 8 shows another block diagram showing another embodiment.

FIGURE 6 shows only a case of junction pointed circuit, however, the present invention can be applied to a logic circuit as shown in FIGURE 8. In this case, if electric voltages $e_1$–$e_6$ are produced by a circuit of composed vectors as shown in FIGURE 5, and said electric voltages $e_1$–$e_6$ are applied to a switch circuit, such as a Schmitt trigger or the like, modified into rectangular waves as shown in FIGURE 6, and applied to the circuit shown in FIGURE 8, then a distance relay which generates an output only in the predetermined area of operation can be realized.

In FIGURE 6b and FIGURE 7, if at least one signal of $e'_1$–$e'_4$ makes before $e'_6$ or after $e'_5$, then no-operational condition may be established, so that it is obvious that there occurs no erroneous operation even though one of the remaining signals becomes zero or disturbed.

This invention is not confined to the embodiments shown and described, but may be changed or modified so long as such changes or modifications mark no material departure from the salient features of the invention as expressed in the appended claims.

What is claimed is:

1. A method of protecting an AC electric system from short circuit by a distance relay having quadrilateral characteristics comprising the steps of:
    (a) forming voltages $IZ_1$, $IZ_2$, $IZ_3$, $IZ_4$, $IZ_5$ and $IZ_6$ by passing an electric current I proportional to the electric current of the electric system through six simulated impedance elements $Z_1$, $Z_2$, $Z_3$, $Z_4$, $Z_5$ and $Z_6$,
    (b) making said simulated impedances to be upon extended sides of a parallelogram of a predetermined operating characteristic upon an impedance diagram,
    (c) forming vector voltages $e_1$, $e_2$, $e_3$ and $e_4$ by vectorially summing the voltage of the electric system to said voltages $IZ_1$, $IZ_2$, $IZ_3$ and $IZ_4$,
    (d) detecting location of short circuit by detecting whether all of said vector voltages are retarded more than said voltage $IZ_5$ or advanced more than said voltage $IZ_6$.

2. A method according to claim 1 in which certain of said simulated impedance elements $Z_1$, $Z_2$, $Z_3$ and $Z_4$ also serve as simulated impedance elements $Z_5$ and $Z_6$.

3. A distance relay for protecting an AC electric system having a quadrilateral characteristic defined by a line impedance and a fault resistance on an impedance diagram comprising:
    (a) means for providing a voltage $e_5$ advanced by 180 degrees more than the electric current of the system to be protected,
    (b) means for providing a voltage $e_6$ retarded by 180 degrees minus the line impedance phase angle of the system more than said voltage $e_5$ by flowing the electric current of the system through a simulated impedance element having an impedance phase angle equal to the line impedance phase angle of the system, (c) first vector sum means for providing voltages of $IZ_3$, $IZ_2$, $IZ_1$ and $IZ_4$ by flowing an electric current proportional to the electric current of the system through, respectively, a reference impedance $Z_3$ located upon an R axis in a first quadrant upon an impedance diagram, a reference impedance $Z_2$ located upon a line showing the line impedance of the system in the impedance diagram, a reference impedance $Z_1$ located upon a line parallel to the R axis in the second quadrant of the impedance diagram, and a reference impedance $Z_4$ located upon a line parallel to a line showing the line impedance and located within the fourth quadrant of the impedance diagram, none of said impedance elements appearing on the impedance diagram within a parallelogram defined by the line impedance and the fault resistance, (d) second vector sum means which is connected to said first vector sum means and adapted to form vector sum AC voltages of $e_1 = IZ_1 - V$, $e_2 = IZ_2 - V$, $e_3 = V - IZ_3$, $e_4 = V - IZ_4$ by vectorially summing the voltage of the system to each of said voltages $IZ_3$, $IZ_2$, $IZ_1$, and $IZ_4$, (e) a phase comparator for detecting that said voltages $e_1$, $e_2$, $e_3$ and $e_4$ are retarded more than said voltage $e_5$ but advanced more than said voltage $e_6$.

4. The apparatus of claim 3 in which said phase comparator comprises:

(a) a signal converting circuit responsive to voltages $e_1$, $e_2$, $e_3$, $e_4$, $e_5$ and $e_6$ to form rectangular logic signal outputs $e_1'$, $e_2'$, $e_3'$, $e_4'$, $e_5'$ and $e_6'$, said rectangular logic signal outputs having a pulse width equal to a half wave of the sinusoidal wave of said AC voltages, (b) first means for generating an output signal only when all of $e_1'$, $e_2'$, $e_3'$, and $e_4'$ are zero at the moment when $e_5'$ becomes one, (c) second means for generating an output signal when all of $e_1'$, $e_2'$, $e_3'$, $e_4'$, and $e_6'$ becomes one while $e_5'$ remains at one due to the output of said first means, (d) means for maintaining the output signal of said second means at least for a time equal to a half wave of the AC voltages whereby it is possible to detect that each of $e_1$, $e_2$, $e_3$ and $e_4$ is retarded more than $e_5$ but advanced more than $e_6$ by detecting that $e_1'$, $e_2'$, $e_3'$ and $e_4'$, change from a zero state to a one state while said $e_6'$ becomes one after $e_5'$ has become one.

References Cited

UNITED STATES PATENTS

| | | | |
|---|---|---|---|
| 3,325,688 | 6/1967 | Riebs | 317—36 |
| 3,340,434 | 9/1967 | Riebs | 317—36 |
| 3,369,156 | 2/1968 | Souillard | 317—36 |

LEE T. HIX, Primary Examiner

J. D. TRAMMELL, Assistant Examiner

U.S. Cl. X.R.

317—36